United States Patent
Kawai et al.

(10) Patent No.: US 10,710,446 B2
(45) Date of Patent: Jul. 14, 2020

(54) ENGINE STARTING SYSTEM FOR VEHICLE

(71) Applicant: TOYOTA JIDOSHA KABUSHIKI KAISHA, Toyota-shi, Aichi (JP)

(72) Inventors: Takayoshi Kawai, Susono (JP); Naoto Kato, Susono (JP); Naoya Takagi, Mishima (JP); Yasuhiro Kuze, Numazu (JP); Teruhiko Miyake, Sunto-gun (JP); Teppei Yoshioka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 16/263,108

(22) Filed: Jan. 31, 2019

(65) Prior Publication Data
US 2019/0263249 A1    Aug. 29, 2019

(30) Foreign Application Priority Data

Feb. 26, 2018    (JP) .................................. 2018-031441

(51) Int. Cl.
*B60K 6/365* (2007.10)
*B60K 6/48* (2007.10)
*B60K 6/543* (2007.10)

(52) U.S. Cl.
CPC ................ *B60K 6/365* (2013.01); *B60K 6/48* (2013.01); *B60K 6/543* (2013.01); *B60K 2006/4808* (2013.01)

(58) Field of Classification Search
None
See application file for complete search history.

(56) References Cited

U.S. PATENT DOCUMENTS

| | | | |
|---|---|---|---|
| 6,371,877 B1 * | 4/2002 | Schroeder | F02N 11/04 475/5 |
| 7,771,309 B2 * | 8/2010 | Kamada | B60K 6/442 477/3 |
| 7,896,114 B2 * | 3/2011 | Colvin | B60K 6/48 180/65.28 |
| 9,260,002 B2 * | 2/2016 | Tulpule | B60K 6/442 |

FOREIGN PATENT DOCUMENTS

JP    2013-180698 A    9/2013

\* cited by examiner

*Primary Examiner* — Dirk Wright
(74) *Attorney, Agent, or Firm* — Oliff PLC

(57) ABSTRACT

An engine starting system for starting an engine promptly during propulsion without reducing a drive force. When a condition to crank the engine is satisfied during propulsion in a neutral stage, torque is applied to an input rotary element to crank the engine by reducing a rotational speed of a control rotary element by increasing a torque capacity of a first engagement device to utilize an inertial force of the free rotary element as a reaction force.

8 Claims, 5 Drawing Sheets

ENGINE STARTING SYSTEM FOR VEHICLE

CROSS REFERENCE TO RELATED APPLICATIONS

The present disclosure claims the benefit of Japanese Patent Application No. 2018-031441 filed on Feb. 26, 2018 with the Japanese Patent Office.

BACKGROUND

Field of the Invention

Embodiments of the present disclosure relate to the art of an engine starting system for a vehicle in which the engine as a prime mover may be stopped and started during propulsion.

Discussion of the Related Art

In a conventional vehicle having an engine for generating power by burning fossil fuel, the engine may be stopped during propulsion to reduce fuel consumption and emission when a large power is not especially required. In the vehicle of this kind, the engine is started when an accelerator pedal is depressed to generate a large drive force. In order to start the engine, the vehicle of this kind is provided with a starter motor for cranking the engine. In the vehicle of this kind, however, the starter motor has to be operated frequently every time the engine is required to be started during propulsion. For this reason, the starter motor may be damaged and electricity consumption may be increased.

In order to solve the above-explained disadvantage, in the conventional art, it has been proposed to crank the engine utilizing a kinetic energy of a running vehicle. For example, in the conventional vehicle, a clutch for transmitting an output shaft torque is engaged partially, and the engine is cranked by the torque transmitted through the clutch causing a slip. In this case, however, startup of the engine may be delayed and the kinetic energy may be consumed partially to crank the engine. Consequently, the vehicle may be subjected temporarily to a braking force, and a driver may feel uncomfortable feeling. JP-A-2013-180698 describes a control device for a hybrid electric vehicle having an engine and a motor configured to avoid such disadvantages. According to the teachings of JP-A-2013-180698, a torque generated by the motor serving as a prime mover is used as an assist torque to crank the engine when cranking the engine by a torque transmitted to the engine from wheels.

Thus, according to the teachings of JP-A-2013-180698, the engine is cranked by the torque transmitted from the wheels and the torque of the motor. Therefore, by engaging a clutch partially, a shock resulting from reduction in a drive force may be reduced. In addition, the torque for cranking the engine may be ensured sufficiently so that the engine is started promptly. However, since the kinetic energy of the vehicle is thus used to crank the engine, the vehicle is inevitably subjected to a braking force or a decelerating force even if it is small. Especially, if an oil temperature is low and hence a torque transmitting capacity of the clutch cannot be controlled accurately, the braking force or the decelerating force applied to the vehicle may be increased undesirably. In addition, in a case of starting the engine when the vehicle is powered by the motor, an output torque of the motor will be partially consumed to crank the engine. Consequently, the drive force may be reduced temporarily. Especially, when a state of charge level of a battery is low and hence an output power from the battery is limited, the output torque of the motor cannot be increased greater than the torque for propelling the vehicle. In this case, therefore, the drive force may be reduced temporarily as a result of cranking the engine, and a driver may feel uncomfortable feeling.

SUMMARY

Aspects of embodiments of the present disclosure have been conceived noting the foregoing technical problems, and it is therefore an object of the present disclosure is to provide an engine starting system for starting an engine promptly during propulsion without reducing a drive force.

The engine starting system according to an exemplary embodiment of the present disclosure is applied to a vehicle comprising an engine and an automatic transmission that is connected to an output side of the engine. The automatic transmission comprises an input member to which a torque is delivered from the engine, an output member that delivers the torque to drive wheels, a planetary gear set, and at least one engagement device. The planetary gear set performs a differential action among rotary elements including: a carrier that supports a pinion gear in a rotatable and revolvable manner; a first gear that is engaged with the pinion gear; and a second gear that has a different pitch diameter from that of the first gear and that is also engaged with the pinion gear. A torque transmitting capacity of the engagement device is changed in accordance with an engagement force applied thereto, and the engagement device is engaged and disengaged to change a torque transmission route between the input member and the output member. The automatic transmission is brought into a neutral stage in which a torque transmission between the input member and the output member is interrupted by disengaging the engagement device. In the planetary gear set, a first rotary element serves as a free rotary element that is rotated by the torque delivered thereto without being subjected to a reaction torque during propulsion in the neutral stage, a second rotary element serves as an input rotary element to which the torque is delivered from the input member during propulsion in the neutral stage, and a third rotary element serves as a control rotary element whose rotational speed is changed by increasing a torque transmitting capacity of any of the disengaged engagement devices during propulsion in the neutral stage. The engine starting system comprises a controller that controls the engine and the engagement device. The controller is configured to: determine a satisfaction of a condition to crank the engine during propulsion in the neutral stage; and apply the torque to the input rotary element connected to the engine in a cranking direction using an inertial force of the free rotary element as a reaction force, by increasing a torque transmitting capacity of a first engagement device connected to the control rotary element to reduce the rotational speed of the control rotary element in a condition where the control rotary element is rotated in an opposite direction to the cranking direction and the input rotary element is stopped, upon satisfaction of the condition to crank the engine.

In a non-limiting embodiment, the controller may be further configured to increase a speed difference between the free rotary element and the control rotary element during propulsion in the neutral stage.

In a non-limiting embodiment, the engagement device may include a second engagement device that is connected to the free rotary element, and that is engaged to deliver the torque delivered from the output member to the free rotary element. In addition, the controller may be further configured to increase the speed difference between the free rotary element and the control rotary element during propulsion in the neutral stage by partially engaging the second engagement device while causing a slip.

In a non-limiting embodiment, the vehicle may further comprise a motor that cranks the engine. In addition, the controller may be further configured to rotate the input rotary element by increasing the torque transmitting capacity of the first engagement device during cranking the engine by the motor.

In a non-limiting embodiment, the planetary gear set may be a single-pinion planetary gear set having a sun gear, a ring gear, and a carrier. In the single-pinion planetary gear set, the carrier may serve as the input rotary element, the ring gear may serve as the free rotary element, and the sun gear may serve as the control rotary element. In addition, the first engagement device may be a brake that is engaged to stop a rotation of the sun gear.

In a non-limiting embodiment, the planetary gear set may be a planetary gear set in which the second rotary element serving as the input rotary element is situated between the first rotary element serving as the free rotary element and the third rotary element serving as the control rotary element in a nomographic diagram indicating a relation among rotational speeds of the rotary elements.

In a non-limiting embodiment, the vehicle may be a hybrid vehicle comprising a first motor having a generating function that is connected to the engine and the automatic transmission, and a second motor that is connected to an output side of the automatic transmission. In addition, the controller may be further configured to: crank the engine by the first motor during propulsion in the neutral stage; and rotate the input rotary element by increasing the torque transmitting capacity of the first engagement device during cranking the engine by the first motor.

In a non-limiting embodiment, the second motor may generate a drive force during propulsion in the neutral stage.

According to the exemplary embodiment of the present disclosure, during propulsion in the neutral stage, torque is applied to the input rotary element to crank the engine by reducing a rotational speed of the control rotary element by the first engagement device to utilize an inertial force of the free rotary element as a reaction force. That is, the torque of the input rotary element is used as an assist torque to crank the engine so that the engine is cranked not only by the assist torque of the input rotary element but also by the torque of the motor. According to the exemplary embodiment, therefore, the engine may be started promptly. In other words, a starting response or an accelerating response may be improved. In addition, the assist torque of the input rotary element is generated in a condition where none of the rotary elements is connected to the output member. For this reason, a drive torque will not be reduced when assisting the cranking of the engine by the assist torque, and hence shock will not be generated during cranking of the engine. Further, the cranking of the engine is assisted without consuming electricity, therefore, fuel consumption and power consumption may be reduced.

Furthermore, the above-mentioned reaction force or the assist torque may be increased by increasing a speed difference between the free rotary element and the control rotary element. For this reason, the engine may be started more promptly and certainly.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE
PREFERRED EMBODIMENT(S)

Preferred embodiments of the present disclosure will now be explained with reference to the accompanying drawings.

Figure 1:
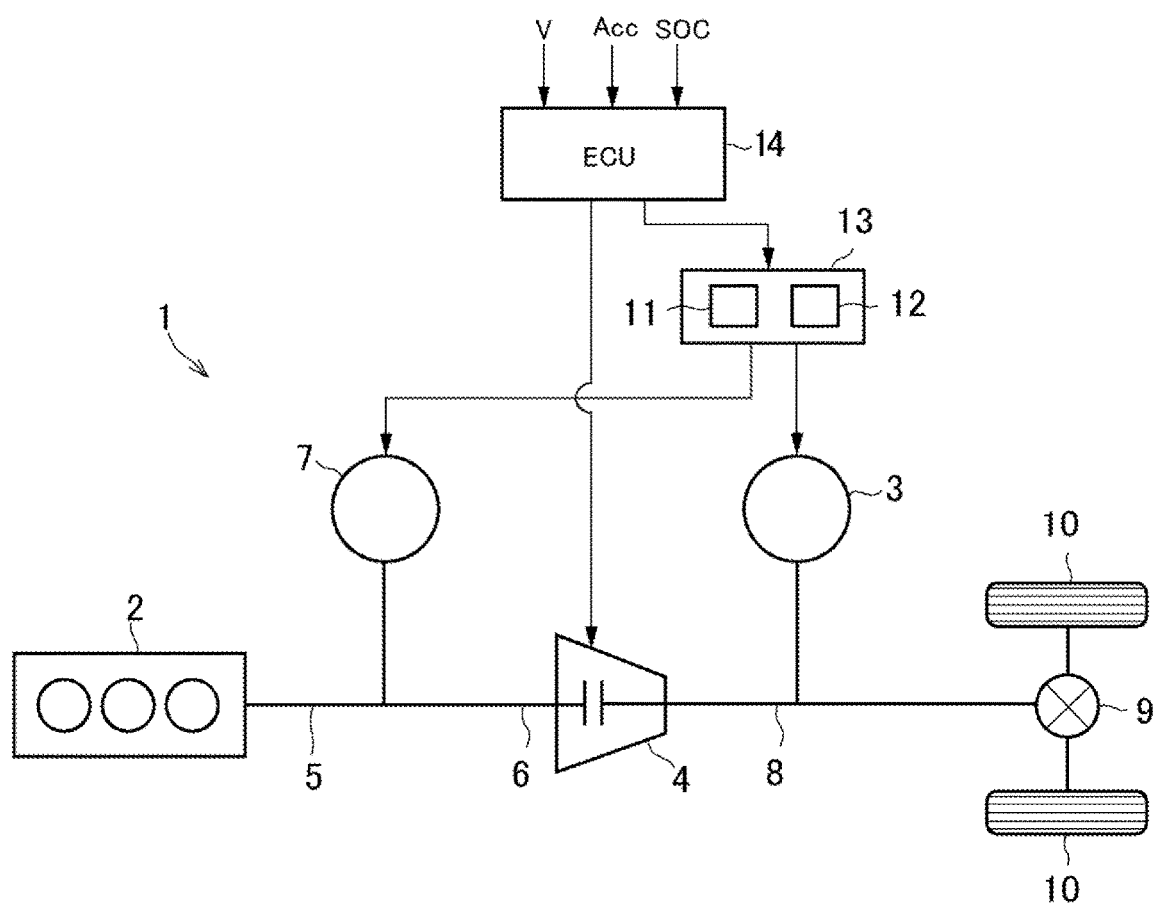
FIG. 1 is a schematic illustration showing one example of a powertrain of the hybrid vehicle to which the engine starting system according to the embodiment is applied.

The engine starting system according to the exemplary embodiment of the present disclosure is applied to a vehicle in which an engine as a prime mover can be stopped and started during propulsion according to need. For example, the engine starting system may be applied to a vehicle that can coast using a kinetic energy of the vehicle itself, and a hybrid vehicle in which a prime mover includes an engine and a motor. Referring now to FIG. 1, there is schematically shown a structure of a hybrid vehicle (as will be simply called the "vehicle" hereinafter) 1 to which the engine starting system according to the exemplary embodiment is applied. A prime mover of the vehicle 1 includes an engine 2 and a drive motor 3 as a second motor. The engine 2 is an internal combustion engine such as a gasoline engine and a diesel engine that generates power by burning fossil fuel, and the engine 2 is cranked to be started (i.e., motoring). An output torque of the engine 2 is controlled by an accelerator device. Specifically, an air intake and a fuel injection of the engine 2 is changed to change the output torque of the engine 2 in accordance with an accelerator opening Acc corresponding to a position of an accelerator pedal.

An automatic transmission (as will be simply called the "transmission" hereinafter) 4 is disposed on an output side of the engine 2, and an output shaft 5 of the engine 2 is connected to an input shaft 6 of the transmission 4. Optionally, a transmission device such as a torque converter and a starting clutch (neither of which are shown) may be interposed between the output shaft 5 and the input shaft 6. A speed ratio of the transmission 4 is changed in accordance with a vehicle speed V and an accelerator opening Acc representing a required drive force. For example, the transmission 4 may be a geared automatic transmission in which a torque transmission route from an input member to an output member is changed depending on engagement states of engagement devices each of which are engaged to transmit torque and disengaged to interrupt torque transmission.

A motor-generator 7 as a first motor is connected to the engine 2 and the transmission 4. If the above-mentioned transmission device is interposed between the output shaft 5 and the input shaft 6, the motor-generator 7 is arranged closer to the engine 2 than the transmission device. The motor-generator 7 is driven as a generator by the engine 2 or the kinetic energy of the vehicle 1 to generate electricity. The motor-generator 7 may also be operated as a motor for generating a drive force to propel the vehicle 1. For example, a permanent magnet synchronous motor may be used as the motor-generator 7.

An output shaft 8 of the transmission 4 is connected to a differential gear unit 9 as a final reduction so that an output torque of the transmission 4 is distributed to drive wheels 10. The drive motor 3 for generating a drive torque to propel the vehicle 1 is connected to the output shaft 8 of the transmission 4.

A three-phase permanent magnet synchronous motor may be used as the drive motor 3. The drive motor 3 and the motor-generator 7 are individually connected to a motor controller 13 including an electric storage device 11 such as a secondary battery and a capacitor, and an inverter 12. The vehicle 1 may be propelled in a series hybrid mode in which the drive motor 3 is operated as a motor by supplying electricity generated by the motor-generator 7 to the drive motor 3. The vehicle 1 may also be propelled in an electric vehicle mode (to be abbreviated as the "EV mode" hereinafter) in which the drive motor 3 is operated as a motor by supplying electricity to the drive motor 3 from the electric storage device 11 while stopping the engine 2. Further, the vehicle 1 may also be propelled in a hybrid mode in which output torques of the engine 2 and the drive motor 3 are delivered to the drive wheels 10. In addition, when decelerating the vehicle 1, a regeneration mode may be selected to operate the drive motor 3 as a generator, and in the regeneration mode, electricity generated by the drive motor 3 may be accumulated in the electric storage device 11.

In order to control the engine 2, the drive motor 3, the motor-generator 7, and the transmission 4 to establish the above-explained operating modes, the vehicle 1 is provided with an electronic control unit (to be abbreviated as the "ECU" hereinafter) 14 as a controller. The ECU 14 includes mainly of a microcomputer configured to execute a calculation based on incident data as well as data and programs installed in advance, and transmit a calculation result in the form of command signal. For example, the ECU 14 receives data about: a vehicle speed V; an accelerator opening Acc representing a required drive force; torque transmitting capacities (or engagement pressures) of the engagement devices of the transmission 4; a crank angle of the engine 2; and a state of charge (to be abbreviated as the "SOC" hereinafter) level of the electric storage device 11. Specifically, a shift map determining the gear stage based on an accelerator opening Acc and a vehicle speed V, a map defining operating regions for selecting the operating mode based on an accelerator opening Acc and a vehicle speed V, torque transmitting capacities of the engagement devices and so on are installed in the ECU 14. For example, The ECU 14 transmits the command signals to the transmission 4 (especially to the engagement devices), the motor-generator 7, the engine 2 and so on. Optionally, a plurality of the ECUs may be arranged in the vehicle to individually control the above mentioned devices.

Figures 2, 3:
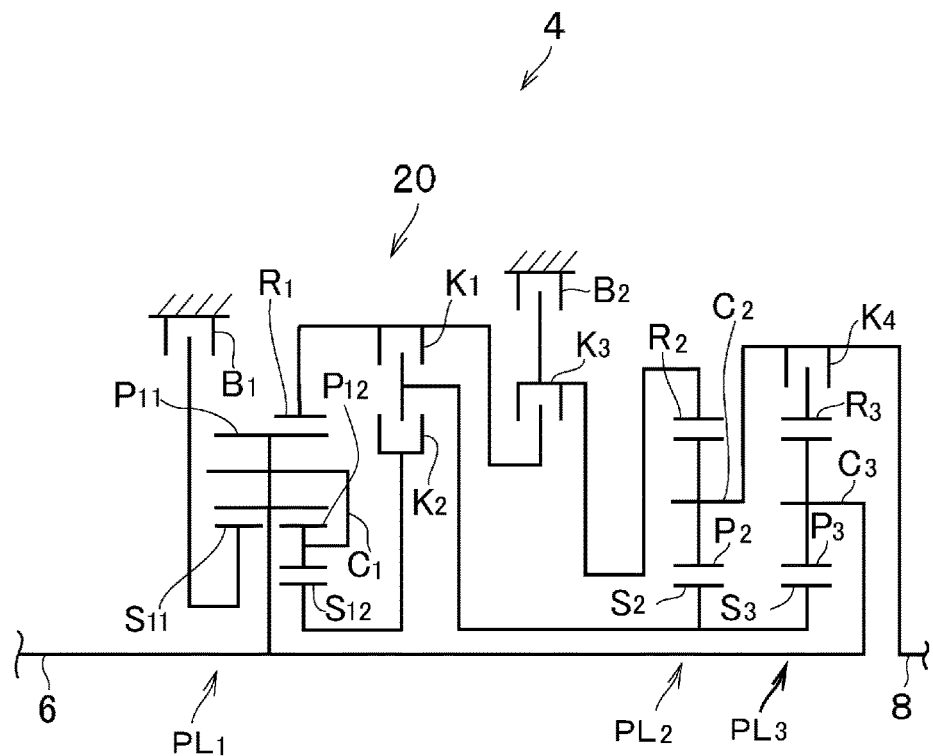
FIG. 2 is a skeleton diagram showing one example of a geared transmission unit of an automatic transmission of the hybrid vehicle.
FIG. 3 is a table showing engagement states of engagement devices in each gear stage.

The transmission 4 is a geared transmission in which a gear stage (or speed ratio) may be selected from a plurality of stages of different speed ratios by manipulating gear sets and the engagement devices. An example of a gear train of the transmission 4 is shown in FIG. 2. A forward stage of the transmission 4 may be selected from the 1st stage to the 10th stage, and a reverse stage is also available. The transmission 4 comprises a geared transmission section 20 to which a torque of the engine 2 is delivered through the input shaft 6 as an input member. The geared transmission section 20 comprises: a Ravigneaux first planetary gear set PL1 formed by combining a single-pinion planetary gear set with a double-pinion planetary gear set; a single-pinion second planetary gear set PL2; and a single-pinion third planetary gear set PL3. The first planetary gear set PL1 comprises: a first sun gear S11; a second sun gear S12; a ring gear R1; a first pinion gear P11 interposed between the first sun gear S11 and the ring gear R1; a second pinion gear P12 interposed between the second sun gear S12 and the first pinion gear P11; and a carrier C1 supporting the first pinion gear P11 and the second pinion gear P12. In the first planetary gear set PL1, the sun gears S11 and S12, the ring gear R1, and the carrier C1 perform a differential action. That is, the first sun gear S11, the first pinion gear P11, and the ring gear R1 serve as a single-pinion planetary gear set. On the other hand, the second sun gear S12, the first pinion gear P11, the second pinion gear P12, and the ring gear R1 serve as a double-pinion planetary gear set. The carrier C1 is connected to the input shaft 6 to serve as an input element of the first planetary gear set PL1. A rotation of the first sun gear S11 is selectively stopped by a first brake B1 as a first engagement device or a brake device.

The second planetary gear set PL2 and the third planetary gear set PL3 are arranged coaxially with the first planetary gear set PL1. The second planetary gear set PL2 comprises a sun gear S2, a ring gear R2, a pinion gear P2 interposed between the sun gear S2 and the ring gear R2, and a carrier C2 supporting the pinion gear P2. That is, in the second planetary gear set PL2, the sun gear S2, the ring gear R2, and the carrier C2 perform a differential action. On the other hand, the third planetary gear set PL3 comprises a sun gear S3, a ring gear R3, a pinion gear P3 interposed between the sun gear S3 and the ring gear R3, and a carrier C3 supporting the pinion gear P3. That is, in the third planetary gear set PL3, the sun gear S3, the ring gear R3, and the carrier C3 perform a differential action.

The sun gear S2 of the second planetary gear set PL2 and the sun gear S3 of the third planetary gear set PL3 are formed integrally, and the unit of the sun gear S2 and the sun gear S3 is selectively connected to the ring gear R1 of the first planetary gear set PL1 through a first clutch K1. The unit of the sun gear S2 and the sun gear S3 is also selectively connected to the second sun gear S12 of the first planetary gear set PL1 through a second clutch K2. The ring gear R2 of the second planetary gear set PL2 is selectively connected to the ring gear R1 of the first planetary gear set PL1 through a third clutch K3. A rotation of the ring gear R2 of the second planetary gear set PL2 is selectively stopped by a second brake B2.

The carrier C3 of the third planetary gear set PL3 is connected to the input shaft 6 to serve as an input element of the geared transmission section 20, and the carrier C2 of the second planetary gear set PL2 is connected to the output shaft 8 as an output member to serve as an output element of the geared transmission section 20. The carrier C2 of the second planetary gear set PL2 is selectively connected to the ring gear R3 of the third planetary gear set PL3 through a fourth clutch K4. When the fourth clutch K4 is in engagement, two rotary elements of the second planetary gear set PL2 are connected to two rotary elements of the third planetary gear set PL3 so that the second planetary gear set PL2 and the third planetary gear set PL3 are rotated integrally.

A frictional engagement device that is actuated hydraulically and whose torque transmitting capacity can be changed continuously may be used as the engagement devices including the first clutch K1 to the fourth clutch K4, and the first brake B1 and the second brake B2.

Engagement states of the clutches K1 to K4, and the brakes B1 and B2 in each gear stage are shown in FIG. 3. As described, the forward stage of the transmission 4 may be selected from the 1st stage to the 10th stage, and the reverse stage (referred to as "Rev" in FIG. 3) is also available. In the table shown in FIG. 3, "O" represents engagement of the engagement device. Those engagement devices are actuated hydraulically, and a hydraulic control unit (not shown) for manipulating the engagement devices is operated electrically. A torque transmitting capacity of each of the engagement devices is changed in accordance with a hydraulic pressure (i.e., an engagement force) applied thereto. That is, the engagement device may be engaged partially to cause a slip by controlling the hydraulic pressure applied thereto, and when the engagement device is in partial engagement, a torque transmitting capacity of the engagement device may be changed continuously.

In the geared transmission section 20, a torque transmission route is changed in accordance with the engagement states of the engagement devices shown in FIG. 3, and a speed ratio of the geared transmission section 20 is changed in accordance with the torque transmission route. A shifting operation of the gear stage of the geared transmission section 20 is executed with reference to the shift map defining gear stage regions based on an accelerator opening Acc and a vehicle speed V. Specifically, the gear stage of the geared transmission section 20 is shifted when an operating point of the vehicle 1 governed by an accelerator opening Acc and a vehicle speed V shifts across a shifting boundary defining regions of the gear stages in the shift map. That is, a target stage is determined based on a position of the accelerator pedal and a vehicle speed or a rotational speed of a predetermined rotary member corresponding to the vehicle speed, and the engagement devices are engaged and disengaged to establish the target stage.

Since the vehicle 1 shown in FIG. 1 is provided with the drive motor 3 connected to the driver wheels 10, the vehicle 1 may be propelled by the drive motor 3 while stopping the engine 2. In the EV mode in which the drive motor 3 is operated as a prime mover, the engine 2 is stopped and the transmission 4 is brought into a neutral stage so as to reduce a drag loss resulting from rotating the engine 2 and the gears of the geared transmission section 20 passively, and to reduce fuel consumption. In the neutral stage, the clutches K1 to K4 and the brakes B1 and B2 are disengaged. A maximum output torque of the drive motor 3 is smaller than a maximum output torque of the engine 2, therefore, the EV mode is selected when a required drive force represented by the accelerator opening Acc is small. When the accelerator pedal is depressed deeply during propulsion in the EV mode, the operating mode is shifted from the EV mode to the HV mode and the engine 2 is started.

Figure 4:
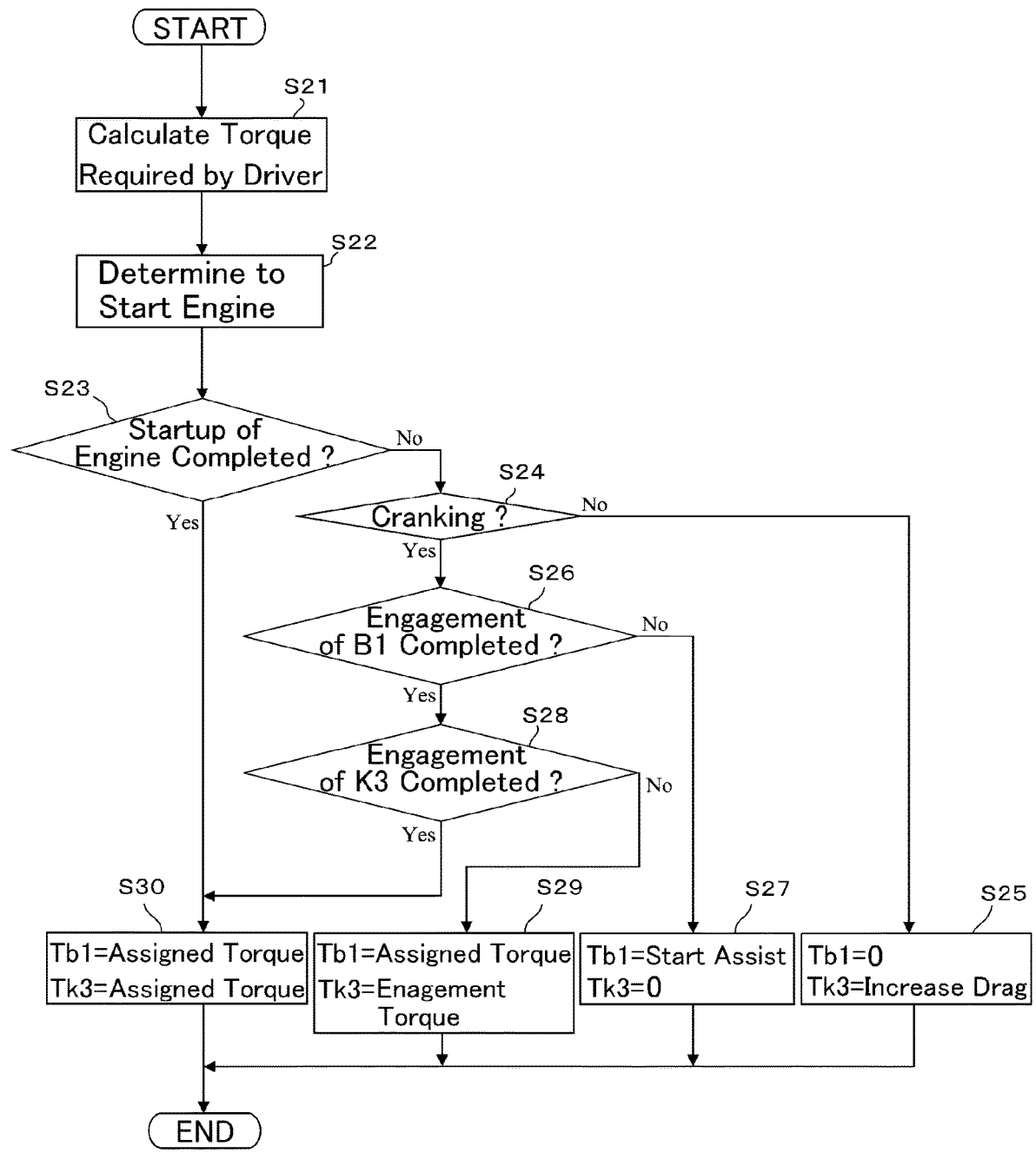
FIG. 4 is a flowchart showing one example of a routine executed by the engine starting system.

In this situation, according to the exemplary embodiment, the engine 2 is cranked by the motor-generator 7, and the cranking of the engine 2 is assisted by an inertial force of the geared transmission section 20 of the transmission 4. An example of the routine for assisting the cranking of the engine 2 is shown in FIG. 4. The routine shown in FIG. 4 is executed by the ECU 14 during propulsion in the EV mode while stopping the engine 2.

First of all, at step S21, a torque required by the driver is calculated based on an accelerator opening Acc. Instead, the accelerator opening Acc may also be detected directly at step S21. Then, at step S21, a determination to start (or crank) the engine 2 is made based on the torque required by the driver. As described, the operating mode of the vehicle 1 is selected from the EV mode, the HV mode, and so on based on the operating condition governed by an accelerator opening Acc and a vehicle speed V. That is, when a depression of the accelerator pedal is increased thereby increasing the accelerator opening Acc representing the required torque, the operating mode is shifted from the EV mode to the HV mode. Consequently, a determination to start the engine 2 is made at step S22. For example, at step S22, a flag representing a satisfaction of a condition to start the engine 2 is turned on.

Thereafter, it is determined at step S23 whether the startup of the engine 2 has currently been completed. If the startup of the engine 2 has not yet been commenced, or if the startup of the engine 2 is still being executed so that answer of step S23 will be NO, the routine progresses to step S24 to determine whether the engine 2 is being cranked. Specifically, cranking of the engine 2 is executed by operating the motor-generator 7 as a motor to rotate the output shaft 5 of the engine 2 by an output torque of the motor-generator 7. However, at a point when the determination to start the engine 2 is made, the cranking of the engine 2 by the motor-generator 7 has not yet been commenced. In this situation, therefore, the answer of step S24 will be NO and the routine progresses to step S25. At step S25, a torque transmitting capacity Tb1 of the first brake B1 is reduced to zero, and a torque transmitting capacity Tk3 of the third clutch K3 is adjusted in such a manner as to achieve a partial engagement of the third clutch K3 while causing a slip thereby increasing a drag. Accordingly, the third clutch K3 serves as a second engagement device. Thereafter, the routine returns. A situation of this case will be explained with reference to FIG. 5.

Figure 5:
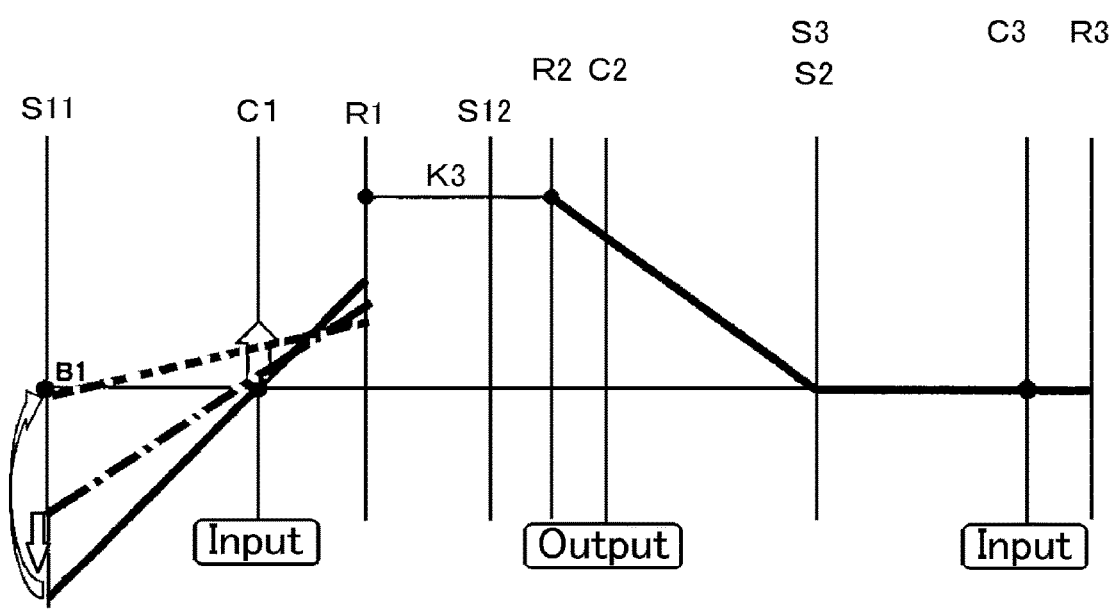
FIG. 5 is a nomographic diagram showing a situation of each planetary gear set of the geared transmission unit when cranking the engine.

The gear train shown in FIG. 2 is formed of three sets of planetary gear sets including the Ravigneaux first planetary gear set PL1. FIG. 5 is a nomographic diagram showing a situation of each of the planetary gear sets PL1, PL2, and PL3 when cranking the engine 2 in the neutral stage. In the nomographic diagram shown in FIG. 5, each vertical line individually represents the rotary element of the planetary gear set. Given that a clearance between the vertical line representing the carrier and the vertical line representing the ring gear is "1", a clearance between the vertical line representing the carrier and the vertical line representing the ring gear is set based on a gear ratio of the planetary gear set (i.e., ratio between number of teeth of the sun gear and number of teeth of the ring gear). A rotational speed of each of the rotary elements is indicated as a vertical level on each of the vertical lines from a base line drawn horizontally perpendicular to the vertical lines.

In the neutral stage, all of the clutches K1 to K4, and the brakes B1 and B2 are disengaged. That is, torque transmitting capacities of the clutches K1 to K4, and the brakes B1 and B2 are substantially zero. In this situation, the vehicle 1 is powered by the drive motor 3, and hence the carrier C2 (referred to as "output" in FIG. 5) of the second planetary gear set PL2 as the output element is rotated at a speed corresponding to a current vehicle speed V. By contrast, since the carrier C3 of the third planetary gear set PL3 is not rotated together with the input shaft 6, the unit of the sun gear S2 of the second planetary gear set PL2 and the sun gear S3 of the third planetary gear set is not rotated. Since the sun gear S2 is stopped and the carrier C2 is rotated, the ring gear R2 of the second planetary gear set PL2 is rotated at a speed higher than a speed of the carrier C2 in the same direction.

In this situation, the sun gear S3, the carrier C3, and the ring gear R3 of the third planetary gear set PL3 are not rotated.

The first sun gear S11, the second sun gear S12, the carrier C1, and the ring gear R1 of the first planetary gear set PL1 are also not rotated. In this situation, a rotational speed on the ring gear R1 is raised by partially engaging the third clutch Tk3 to increase a torque transmitting capacity. Consequently a rotational speed of the first sun gear S11 situated in the opposite side in the nomographic diagram to the ring gear R1 across the carrier C1 as the input element is increased in a reverse direction (opposite to the rotational direction of the engine 2), as indicated by the thick solid line in FIG. 5. In this situation, specifically, the first sun gear S11 whose rotational speed can be reduced by the first brake B1 is rotated in a direction opposite to a cranking direction (i.e., the forward direction) of the engine 2, the carrier C1 connected to the engine 2 is stopped, and the ring gear R1 is rotated in the cranking direction. As can be seen by comparing the torque transmission by such inevitable drag and the drag increasing control of the third clutch K3, it may be concluded that the drag increasing control of the third clutch K3 at step S25 is a control to increase a speed difference between the first sun gear S11 and the ring gear R1.

Turning back to FIG. 4, after the lapse of predetermined period of time from the execution of step S25, the motor-generator 7 is operated as a motor by the electricity supplied from the electric storage device 11 to crank the engine 2. In this situation, the answer of the above-explained step S24 will be YES. If the cranking of the engine 2 is being executed so that the answer of step S24 is YES, the routine progresses to step S26 to determine whether the engagement of the first brake B1 has been completed. Such determination at step S26 may be made based on a transmission of an engagement signal to the first brake B1 or an engagement pressure applied to the first brake B1 detected by a sensor (not shown). As described, the torque transmitting capacity Tb1 of the first brake B1 has been reduced to zero at step S25 before the determination at step S26. Therefore, if the determination at step S26 is executed after the execution of step S25, the answer of step S26 will be NO.

If the cranking of the engine 2 is still being executed and the engagement of the first brake B1 has not yet been completed so that the answer of step S26 is NO, the routine progresses to step S27 to execute a torque assist control by the first brake B1 to start the engine 2. At step S27, specifically, the torque assist control is executed by disengaging the third clutch K3 to reduce the torque transmitting capacity Tk3 of the third clutch K3 to zero, while increasing the torque transmitting capacity Tb1 of the first brake B1 to a capacity possible to assist the startup of the engine 2. Specifically, the torque transmitting capacity Tb1 of the first brake B1 is increased to a capacity possible to stop the reverse rotation of the first sun gear S11 promptly, and to raise a rotational speed of the carrier C1 connected to the engine 2 temporarily and sufficiently. Such torque transmitting capacity of the first brake B1 differs depending on a capacity of the engine 2, and a structure and a size of the geared transmission section 20, and may be determined based on a result of an experimentation or a simulation.

When the torque transmitting capacity Tb1 of the first brake B1 is increased while rotating the first sun gear S11 in the reverse direction, a torque is applied to the first sun gear S11 in the direction to reduce the rotational speed of the first sun gear S11. In the nomographic diagram shown in FIG. 5, the ring gear R1 is situated in the opposite side to the first sun gear S11 across the carrier C1. Therefore, when the torque is applied to the first sun gear S11 in the direction to reduce the rotational speed thereof, a torque to reduce a rotational speed (i.e., a torque in the reverse direction) is applied to the ring gear R1 rotating in the forward direction. In this situation, the third clutch K3 is disengaged and hence the ring gear R1 is not connected to any of the rotary elements. Therefore, the torque resulting from the change in the rotational speed of the ring gear R1 will not affect the torque of the output shaft 8 (i.e., the drive torque). In other words, the drive force will not be reduced and a shock will not be generated. In addition, an inertia moment as an inertia torque in the forward direction is generated as a result of reduction in the rotational speed of the ring gear R1, and the inertia torque of the ring gear R1 acts as a reaction force against the torque in the direction to reduce the rotational speed of the first sun gear S11. In this situation, therefore, the torque is applied to the carrier C1 in the direction to rotate the carrier C1 in the forward direction, and the torque of the carrier C1 is delivered to the engine 2 to assist the torque for cranking the engine 2 as indicated by the dashed line in FIG. 5. Thus, in this example, the third clutch K3 is disengaged and the ring gear R1 is not connected to any of the rotary elements. That is, the ring gear R1 is allowed to be rotated freely by the torque delivered thereto through the second pinion gear P12 without being subjected to the reaction force. Accordingly, in the embodiment of the present disclosure, the ring gear R1 serves as a free rotary element (or a first rotary element), the carrier C1 serves as an input rotary element (or a second rotary element), and the first sun gear S11 serves as a control rotary element (or a third rotary element).

By thus controlling the third clutch K3, the output shaft 5 of the engine 2 is rotated to crank the engine 2 by the torque of the motor-generator 7 and the inertia torque of the geared transmission section 20 or the torque reducing the rotational speed of the first sun gear S11. That is, the torque to be generated by the motor-generator 7 may be reduced in an amount of the assist torque established by the geared transmission section 20. For this reason, shortage of the drive torque or acceleration will not be caused when shifting the operating mode from the EV mode to the HV mode, even if the electric power to be supplied from the electric storage device 11 is restricted.

The above-explained torque assist may be executed during a compression process in an initial combustion of the engine 2 or at a termination of the compression process. For example, a timing of the termination of the compression process may be detected based on a crank angle of the engine 2. Therefore, the control for increasing the torque transmitting capacity Tb1 of the first brake B1 may be executed just before the initial combustion of the engine 2 or at the initial combustion of the engine 2.

After a predetermined period of time has elapsed from the execution of step S27 to increase the torque transmitting capacity Tb1 of the first brake B1, the answer of step S26 will be YES. For example, the completion of engagement of the first brake B1 may be determined based on an engagement pressure applied to the first brake B1 or a rotational speed of the first sun gear S11. If the answer of step S26 is YES, the routine progresses to step S28 to determine whether the engagement of the third clutch K3 has been completed. As described, the operating mode is shifted from the EV mode to the HV mode when the accelerator opening Acc is increased during propulsion of the vehicle 1. In this situation, the gear stage of the transmission 4 is selected based on the vehicle speed V and the accelerator opening Acc.

According to the exemplary embodiment, the gear stage is selected from the 8th stage to the 10th stage when establishing the gear stage of the transmission 4 from the neutral stage. That is, in this situation, the third clutch K3 is to be engaged in addition to the first brake B1. As described, the third clutch K3 has been disengaged at step S27, therefore, the answer of step S28 will be NO after the execution of step S27. In this case, the routine progresses to step S29 to increase the torque transmitting capacity Tb1 of the first brake B1 to an assigned capacity possible to establish an assigned torque to be required in the gear stage, and to increase the torque transmitting capacity Tk3 of the third clutch K3 to an engagement capacity so as to engage the third clutch K3 completely without causing a slip. Thereafter, the routine returns.

Specifically, a definition of the assigned torque is a torque applied to the engagement device to be engaged to establish the desired gear stage, and the assigned torque is calculated by adding a predetermined torque determined based on a safety factor to a torque determined based on a structure of the gear train. On the other hand, a definition of the engagement capacity is a torque transmitting capacity possible to transmit or establish torque without causing a slip, and the engagement torque is calculated based on the assigned torque and the output torque of the engine 2. In addition, in order to prevent an occurrence of abrupt change in the output torque (or the drive torque) and a resultant shock, the engagement capacity is increased gradually at a predetermined rate.

By thus increasing the torque transmitting capacity Tk3 of the third clutch K3, the third clutch K3 is engaged completely. In this case, the answer of step S28 will be YES, and the routine progresses to step S30 to increase the torque transmitting capacity Tb1 of the first brake B1 and the torque transmitting capacity Tk3 of the third clutch K3 individually to the assigned capacities possible to establish or transmit the assigned torques determined based on a torque assignment ratio. Thereafter, the routine returns. Consequently, the gear stage selected based on the current vehicle speed V and the accelerator opening Acc is established in the transmission 4. As described, in the transmission 4 having the geared transmission section 20, three engagement devices are engaged in each gear stage. Therefore, although not especially shown in FIG. 4, the engagement device other than the first brake B1 and the third clutch K3 is engaged simultaneously with engaging the first brake B1 and the third clutch K3 sequentially.

Thus, the engine 2 is cranked by the torque of the motor-generator 7 and the assist torque established by the inertia force, and the engine 2 is started by igniting the engine 2 while injecting the fuel to the engine 2. After the completion of startup of the engine 2, the answer of step S23 will be YES, and the routine also progresses to step S30. Consequently, the vehicle 1 is propelled by the drive force generated by the engine 2 in the predetermined gear stage.

Figure 6:
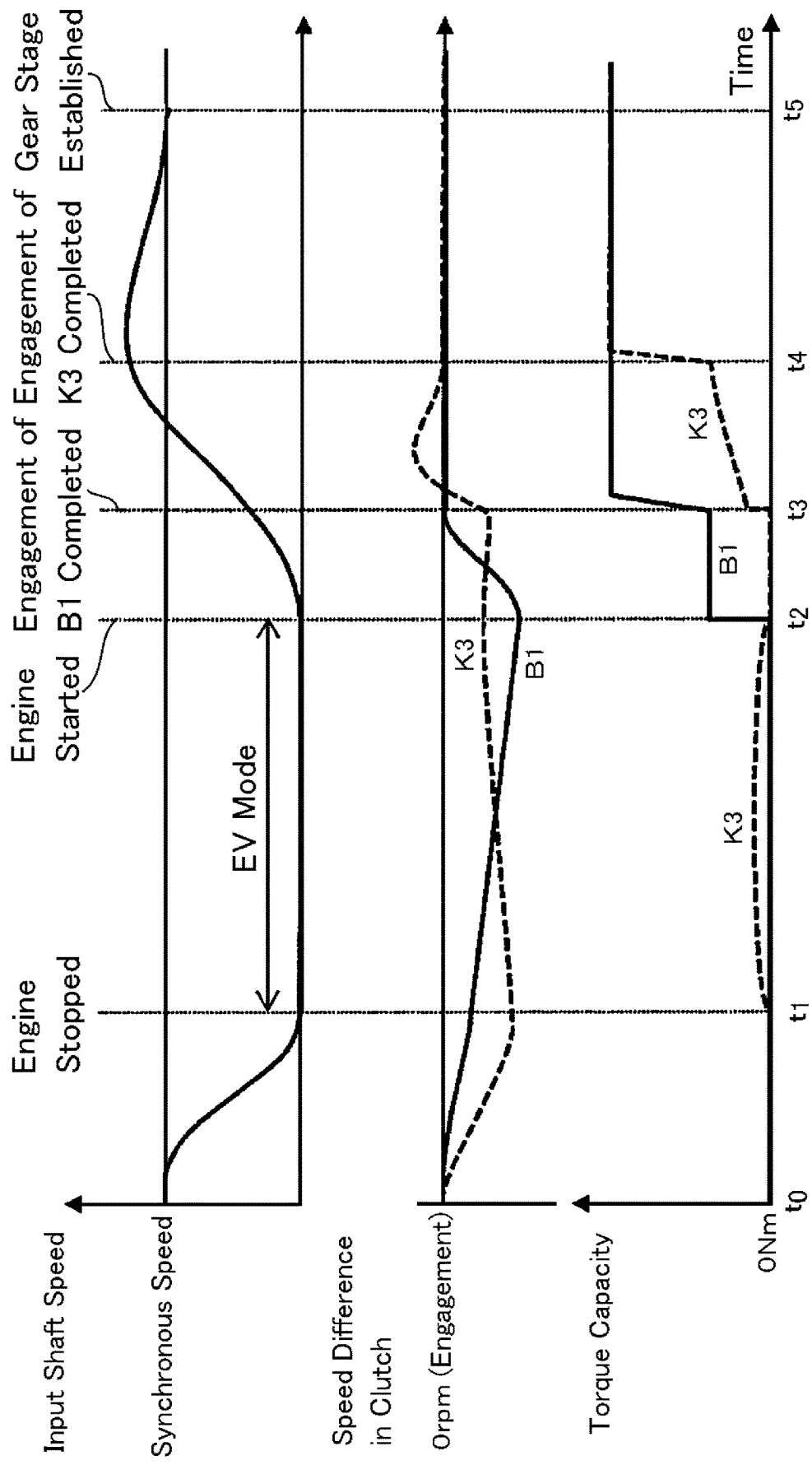
FIG. 6 is a time chart showing temporal changes in a speed of an input shaft, speed differences in a first brake and a third clutch, and torque transmitting capacities of the first brake and the third clutch when cranking the engine while executing a torque assist.

A temporal change in a behavior of the vehicle 1 during execution of the routine shown in FIG. 4 is shown in FIG. 6. Specifically, FIG. 6 shows an example in which the transmission 4 is brought into the neutral stage and the engine 2 is stopped during propulsion of the vehicle 1 in the predetermined gear stage established by engaging the first brake B1, the third clutch K3, and another predetermined engagement device, and then the engine 2 is started again and the vehicle 1 is propelled in the previous gear stage. Accordingly, temporal changes in a speed of the input shaft 6, speed differences in the first brake B1 and the third clutch K3, and torque transmitting capacities of the first brake B1 and the third clutch K3 are indicated in FIG. 6. In FIG. 6, specifically, each of the speed difference in the first brake B1 and the third clutch K3 is indicated individually as a relative speed including a rotational direction between a frictional element connected to the first planetary gear set PL1 and other frictional element.

When propelling the vehicle 1 while operating the engine 2, the input shaft 6 is rotated at a synchronous speed which is calculated by multiplying a rotational speed of the output shaft 8 by a speed ratio. In this situation, both of the first brake B1 and the third clutch K3 are engaged, and hence the speed differences in the first brake B1 and the third clutch K3 are respectively zero. When the accelerator pedal is returned so that the accelerator opening Acc is reduced at point t0, a condition to shift the operating mode from the HV mode to the EV mode is satisfied and the transmission 4 is brought into the neutral stage. Consequently, the torque transmitting capacity Tb1 of the first brake B1 and the torque transmitting capacity Tk3 of the third clutch K3 are set respectively to zero. Meanwhile, a control to stop the engine 2 is executed. As a result, the speed of the input shaft 6 is reduced gradually toward zero, and the speed differences in the first brake B1 and the third clutch K3 are increased gradually.

When the engine 2 is stopped and the speed of the input shaft 6 is reduced to zero at point t1, the operating mode is shifted to the EV mode, and the torque transmitting capacity Tk3 of the third clutch K3 is increased to a level at which the third clutch K3 is engaged partially. As a result of stopping the engine 2, a rotational speed of the carrier C1 of the first planetary gear set PL1 is reduced to zero, and rotational speeds of the rotary elements of the first planetary gear set PL1 are changed as indicated by the dashed-dotted line shown in FIG. 5. Specifically, the first sun gear S11 is rotated in the reverse direction, and the ring gear R1 is rotated in the forward direction. In this situation, the third clutch K3 is engaged partially, and as a result, the rotational speed of the ring gear R1 is raised and the rotational speed of the first sun gear S11 is increased in the reverse direction. That is, a speed difference between the ring gear R1 as the free rotary element and the first sun gear S11 as the control rotary element is increased. Consequently, after point t1, the speed difference in the third clutch K3 is reduced and the speed difference in the first brake B1 is increased as indicated in FIG. 6.

Then, when the accelerator pedal is depressed at point t2 so that the accelerator opening Acc is increased, a condition to start the engine 2 is satisfied thereby shifting the operating mode from the EV mode to the HV mode. As described, the engine 2 is started by rotating the output shaft 5 of the engine 2 by the motor-generator 7 while applying the assist torque established by the inertial force of the transmission 4 (or the geared transmission section 20) to the output shaft 5. To this end, the torque transmitting capacity Tb1 of the first brake B1 is set to the capacity possible to establish the assist torque explained with reference to FIG. 4. Meanwhile, the torque transmitting capacity Tk3 of the third clutch K3 causing a slip is reduced to zero. Consequently, the inertial force maintaining the rotational speed of the ring gear R1 acts as a reaction torque against the torque stopping the rotation of the first sun gear S11, and the forward torque is applied to the carrier C1 connected to the engine 2. The reaction torque and the forward torque of the carrier C1 are increased with an increase in the rotational speed of the ring gear R1 in the forward direction. In this example, since the third clutch K3 is brought into the partial engagement thereby increasing the rotational speed of the ring gear R1 (i.e., the speed difference between the ring gear R1 and the first sun gear S11), the forward torque (i.e., the assist torque) of the carrier C1 can be increased.

The output shaft 5 of the engine 2 is also rotated in the forward direction by the forward torque of the carrier C1. That is, the engine 2 is cranked not only by the torque of the motor-generator 7 but also by the torque delivered from the carrier C1. In other words, the cranking of the engine 2 is assisted by the torque of the carrier C1. In FIG. 5, each dashed line indicates a situation in which the torque transmitting capacity Tb1 of the first brake B1 is thus increased. In this situation, since the third clutch K3 is disengaged, the ring gear R1 is disconnected from the ring gear R2 of the second planetary gear set PL2. Therefore, even if the torque is applied to the ring gear R1 of the first planetary gear set PL1 as a result of starting the engine 2, the torque of the output shaft 8 (i.e., the drive torque) will not be changed and hence a shock will not be generated.

The assist torque is added to the cranking torque of the motor-generator 7 at a final phase of the compression process or immediately before an ignition process of the engine 2. That is, the initial combustion is caused immediately after increasing the torque transmitting capacity Tb1 of the first brake B1 to the capacity possible to transmit the assist torque. As a result, the engine 2 starts rotating autonomously, and the speed of the input shaft 6 is further increased.

After cranking the engine 2, the speed of the input shaft 6 is increased with an increase in the rotational speed of the engine 2. In this situation, since the torque transmitting capacity Tb1 of the first brake B1 is increased to establish the assist torque, the speed difference in the first brake B1 is reduced gradually. Meanwhile, the rotational speed of the carrier C1 starts increasing, therefore, the speed difference in the carrier C1 as the input element connected to the engine 2 will not be changed significantly even if the rotational speed of the first sun gear S11 in the reverse direction is reduced to zero.

When the speed difference in the first brake B1 is reduced to zero at point t3, in other words, when the first brake B1 is engaged completely without causing a slip, the torque transmitting capacity Tb1 of the first brake B1 is increased to the assigned capacity to establish the assigned torque. At the same time, the torque transmitting capacity Tk3 of the third clutch K3 is increased to the engagement capacity. Specifically, the torque transmitting capacity Tk3 of the third clutch K3 is increased stepwise in the initial phase, and then increased at a predetermined rate. In this process, the third clutch K3 is causing a slip. Therefore, the speed difference in the third clutch K3 is changed temporarily from the negative value to the positive value due to a transitional change in the rotational speed of the carrier C1 resulting from an increase in the rotational speed of the engine 2. Eventually, the torque transmitting capacity Tk3 of the third clutch K3 is increased to the engagement capacity so that the speed difference in the third clutch K3 is reduced to zero, and the engagement of the third clutch K3 is completed at point t4. Then, the torque transmitting capacity Tk3 of the third clutch K3 is increased to the assigned capacity to transmit the assigned torque. Thereafter, the third engagement device other than the first brake B1 and the third clutch K3 is engaged completely so that the predetermined gear stage, for example, the gear stage established before the engine 2 was stopped is established in the transmission 4. As a result, the rotational speed of the input shaft 6 is change to the synchronous speed in the established gear stage at point t5.

Thus, according to the exemplary embodiment of the present disclosure, the engine 2 is cranked not only by the motor-generator 7 but also by the inertial force of the transmission 4. For this reason, the engine 2 can be started promptly to avoid acceleration plateau after depressing the accelerator pedal. In addition, the drive torque will not be changed by the torque for assisting the cranking. Therefore, a shortage and an abrupt change of the drive force will not be caused, and hence shocks will not be generated. Further, the cranking of the engine 2 can be assisted without requiring electricity. Therefore, the electric power for propelling the vehicle 1 will not be consumed, and a reduction in the drive force or acceleration will not be caused.

Although the above exemplary embodiment of the present disclosure has been described, it will be understood by those skilled in the art that the present disclosure should not be limited to the described exemplary embodiments, and various changes and modifications can be made within the scope of the present disclosure. For example, a single-pinon planetary gear set or a double-pinion planetary gear set may also be connected to the engine instead of the Ravigneaux first planetary gear set. In addition, a planetary gear set in which two sun gears or ring gears are engaged with a stepped pinion having a diametrically larger portion and a diametrically smaller portion may also be connected to the engine. In this case, the sun gears or the ring gears serve as the first gear and the second gear of the embodiment. That is, gears engaged with the pinion gears and pitch diameters thereof are different from each other may serve as the first gear and the second gear of the embodiment.

In addition, the input rotary element connected to the engine may not be situated between the free rotary element and the control rotary element in the nomographic diagram. For example, it is also possible to use a planetary gear set in which the input rotary element, the control rotary element, and the free rotary element are situated in order in the nomographic diagram, and a planetary gear set in which the input rotary element, the free rotary element, and the control rotary element are situated in order in the nomographic diagram. Further, a starter motor may also be employed to crank the engine instead of the motor-generator. That is, the present disclosure may also be applied to a vehicle other than the hybrid vehicle. Furthermore, any kind of transmission in which the neutral stage is established by disengaging the engagement device may also be used in the present disclosure instead of the transmission in which the forward stage is selected from ten stages.

What is claimed is:

1. An engine starting system for a vehicle, comprising:
an engine; and
an automatic transmission that is connected to an output side of the engine,
wherein the automatic transmission comprises
an input member to which a torque is delivered from the engine,
an output member that delivers the torque to drive wheels,
a planetary gear set that is adapted to perform a differential action among rotary elements including: a carrier that supports a pinion gear in a rotatable and revolvable manner; a first gear that is engaged with the pinion gear; and a second gear that has a different pitch diameter from that of the first gear and that is also engaged with the pinion gear, and
at least one engagement device in which a torque transmitting capacity is changed in accordance with an engagement force applied thereto, and which is engaged and disengaged to change a torque transmission route between the input member and the output member, the automatic transmission is brought into a neutral stage in which a torque transmission between the input member and the output member is interrupted by disengaging the engagement device, a first rotary element as one of the rotary elements serves as a free rotary element that is rotated by the torque delivered thereto without being subjected to a reaction torque during propulsion in the neutral stage, a second rotary element as another one of the rotary elements serves as an input rotary element to which the torque is delivered from the input member during propulsion in the neutral stage, a third rotary element as still another one of the rotary elements serves as a control rotary element whose rotational speed is changed by increasing a torque transmitting capacity of any of the disengaged engagement devices during propulsion in the neutral stage, the engine starting system comprises a controller that controls the engine and the engagement device, the controller is configured to determine a satisfaction of a condition to crank the engine during propulsion in the neutral stage, and apply the torque to the input rotary element connected to the engine in a cranking direction using an inertial force of the free rotary element as a reaction force, by increasing a torque transmitting capacity of a first engagement device connected to the control rotary element to reduce the rotational speed of the control rotary element in a condition where the control rotary element is rotated in an opposite direction to the cranking direction and the input rotary element is stopped, upon satisfaction of the condition to crank the engine.

2. The engine starting system for the vehicle as claimed in claim 1, wherein the controller is further configured to increase a speed difference between the free rotary element and the control rotary element during propulsion in the neutral stage.

3. The engine starting system for the vehicle as claimed in claim 2, wherein the engagement device includes a second engagement device that is connected to the free rotary element, and that is engaged to deliver the torque delivered from the output member to the free rotary element, and the controller is further configured to increase the speed difference between the free rotary element and the control rotary element during propulsion in the neutral stage by partially engaging the second engagement device while causing a slip.

4. The engine starting system for the vehicle as claimed in claim 1, wherein the vehicle further comprises a motor that cranks the engine, and the controller is further configured to rotate the input rotary element by increasing the torque transmitting capacity of the first engagement device during cranking the engine by the motor.

5. The engine starting system for the vehicle as claimed in claim 1, wherein the planetary gear set includes a single-pinion planetary gear set having a sun gear, a ring gear, and a carrier, the carrier serves as the input rotary element, the ring gear serves as the free rotary element, the sun gear serves as the control rotary element, and the first engagement device includes a brake that is engaged to stop a rotation of the sun gear.

6. The engine starting system for the vehicle as claimed in claim 1, wherein the planetary gear set includes a planetary gear set in which the second rotary element serving as the input rotary element is situated between the first rotary element serving as the free rotary element and the third rotary element serving as the control rotary element in a nomographic diagram indicating a relation among rotational speeds of the rotary elements.

7. The engine starting system for the vehicle as claimed in claim 1, wherein the vehicle includes a hybrid vehicle comprising a first motor having a generating function that is connected to the engine and the automatic transmission, and a second motor that is connected to an output side of the automatic transmission, and the controller is further configured to crank the engine by the first motor during propulsion in the neutral stage, and rotate the input rotary element by increasing the torque transmitting capacity of the first engagement device during cranking the engine by the first motor.

8. The engine starting system for the vehicle as claimed in claim 7, wherein the second motor generates a drive force during propulsion in the neutral stage.

* * * * *